(12) United States Patent
Kira et al.

(10) Patent No.: US 9,389,597 B2
(45) Date of Patent: Jul. 12, 2016

(54) MOTOR CONTROL DEVICE

(71) Applicant: KABUSHIKI KAISHA YASKAWA DENKI, Kitakyushu-shi (JP)

(72) Inventors: Toshinobu Kira, Kitakyushu (JP); Tadashi Okubo, Kitakyushu (JP); Yasuyuki Takei, Kitakyushu (JP); Makoto Akama, Kitakyushu (JP); Yusuke Oka, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 0 days.

(21) Appl. No.: 14/484,269

(22) Filed: Sep. 12, 2014

(65) Prior Publication Data

US 2014/0375243 A1    Dec. 25, 2014

Related U.S. Application Data

(63) Continuation of application No. PCT/JP2012/057027, filed on Mar. 19, 2012.

(51) Int. Cl.
  *G05B 11/06*  (2006.01)
  *H02P 29/02*  (2016.01)
  *H02P 6/06*   (2006.01)

(52) U.S. Cl.
  CPC  *G05B 11/06* (2013.01); *H02P 6/06* (2013.01); *H02P 29/026* (2013.01)

(58) Field of Classification Search
  CPC .......................................... G05B 11/06
  USPC ........................ 318/566, 563, 560
  See application file for complete search history.

(56) References Cited

U.S. PATENT DOCUMENTS

| 4,879,502 A | * | 11/1989 | Endo | H02P 6/14 318/723 |
| 5,115,418 A | * | 5/1992 | Shimada | B25J 9/163 318/568.18 |
| 6,590,360 B2 | * | 7/2003 | Hirata | B60K 6/485 318/151 |
| 2014/0070752 A1 | * | 3/2014 | Otsuji | G05B 19/19 318/603 |

FOREIGN PATENT DOCUMENTS

| JP | 09-191582 | 7/1997 |
| JP | 09-247986 | 9/1997 |

(Continued)

OTHER PUBLICATIONS

International Search Report for corresponding International Application No. PCT/JP2012/057027, Apr. 17, 2012.
Written Opinion for corresponding International Application No. PCT/JP2012/057027, Apr. 17, 2012.

(Continued)

*Primary Examiner* — David S Luo
(74) *Attorney, Agent, or Firm* — Mori & Ward, LLP

(57) ABSTRACT

This disclosure discloses a motor control device including a main circuit, a voltage detector, and a controller. The controller includes a position controller and a speed controller, The position controller generates a speed command. The speed controller generates a torque command and controls a inverter based on the torque command. Further, the controller includes a torque limiter, and a speed matching instruction part. The torque limiter starts torque limiting by the torque command to a predetermined torque or less and cancels the torque limiting. The speed matching instruction part matches the speed command with a first position command speed after the cancellation of the torque limiting. The holding part calculates and holds an accumulated position deviation.

20 Claims, 14 Drawing Sheets

(56) References Cited

FOREIGN PATENT DOCUMENTS

| | | |
|---|---|---|
| JP | 2012-039847 | 2/2012 |
| WO | WO 2008/093485 | 8/2008 |

OTHER PUBLICATIONS

Extended European Search Report for corresponding EP Application No. 12871863.2 — 1806, May 13, 2016.

* cited by examiner

MOTOR CONTROL DEVICE

CROSS-REFERENCE TO RELATED APPLICATION

This is a continuation application of PCT/JP2012/057027, filed Mar. 19, 2012, which was not published under PCT article 21(2) in English.

FIELD OF THE INVENTION

The disclosed embodiment relates to motor control devices.

DESCRIPTION OF THE RELATED ART

A motor control device that can continue an operation even if a power source instantaneously stops the supply of power is known.

SUMMARY OF THE INVENTION

According to one aspect of the disclosure, there is provided a motor control device comprising a main circuit, a voltage detector, and a controller. The main circuit includes a converter configured to convert an alternating-current from an alternating-current power source into a direct-current power, a smoothing capacitor, and an inverter configured to convert the direct-current power into an alternating-current power to drive a motor. The voltage detector detects a direct-current voltage of the main circuit. The controller includes a position controller and a speed controller. The position controller generates a speed command based on a position deviation between a first position command from a master controller and a motor position. The speed controller generates a torque command based on a speed deviation between the speed command and a motor speed and controls the inverter based on the torque command. Further, the controller includes a torque limiter, and a speed matching instruction part. The torque limiter starts torque limiting which limits a command torque by the torque command to a predetermined torque or less when the voltage detector detects that the direct-current voltage falls below a predetermined voltage and cancels the torque limiting when the voltage detector detects that the direct-current voltage exceeds the predetermined voltage. The speed matching instruction part matches the speed command with a first position command speed, which is a time differential value of the first position command, when the motor speed matches the first position command speed after the cancellation of the torque limiting.

DESCRIPTION OF THE EMBODIMENTS

An embodiment will be described below with reference to drawings.

<Configuration of a Motor Control Device>

Figure 1:
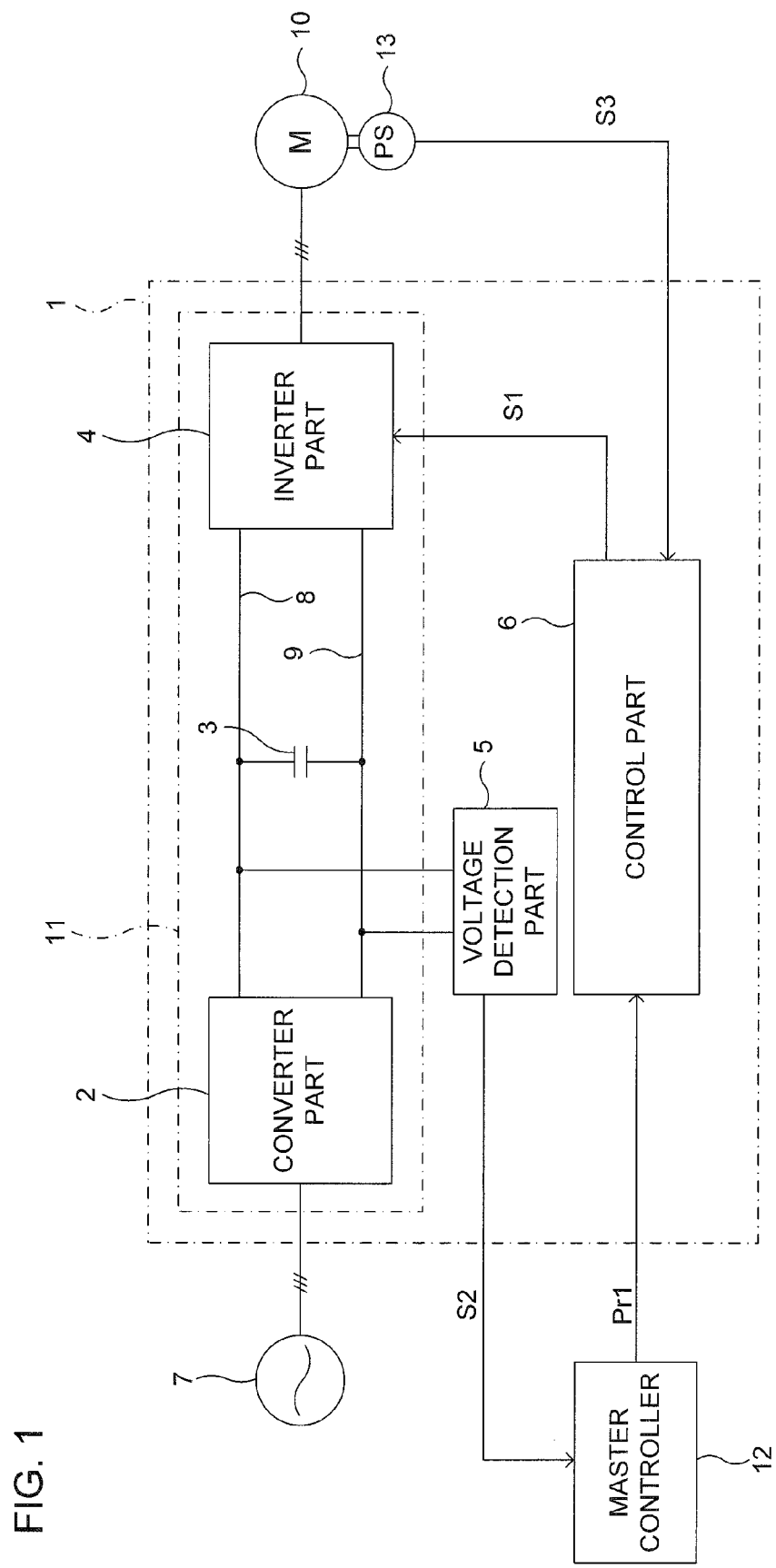
FIG. 1 is a block diagram showing a functional configuration of a motor control device according to an embodiment.

The functional configuration of a motor control device 1 according to the present disclosure will first be described with reference to FIG. 1. As shown in FIG. 1, the motor control device 1 includes a converter part 2, a smoothing capacitor 3, an inverter part 4, a voltage detection part 5 and a control part 6.

The converter part 2 converts an alternating-current power supplied from an alternating-current power source 7 into a direct-current power. The smoothing capacitor 3 is connected to a positive-side direct-current bus bar 8 and a negative-side direct-current bus bar 9 parallel to a direct-current power source, and smoothes the direct-current power converted by the converter part 2. The inverter part 4 converts the direct-current power into an alternating-current power based on a control signal S1 (such as a PWM signal) from the control part 6, and drives a motor 10. The converter part 2, the smoothing capacitor 3, the inverter part 4 and the like constitute a main circuit 11.

The voltage detection part 5 is connected to the positive-side direct-current bus bar 8 and the negative-side direct-current bus bar 9, and detects the direct-current voltage of the main circuit 11. The voltage detection part 5 sets, with a parameter, a predetermined voltage that is an insufficient voltage threshold value, and when the direct-current voltage falls below the predetermined voltage, the voltage detection part 5 generates a warning signal S2 to output it to a master controller 12 whereas when the direct-current voltage exceeds (is restored) the predetermined voltage, the voltage detection part 5 stops the output of the warning signal S2. While the warning signal S2 is input from the voltage detection part 5, the master controller 12 outputs a torque limiting signal (not shown) to a torque limiting part 17, which will be described later, of the control part 6. The control part 6 mainly controls the inverter part 4 based on a first position command Pr1 from the master controller 12.

The torque limiting part 17 corresponds to an example of means for starting torque limiting which limits a command torque by the torque command to a predetermined torque or less when the voltage detection part detects that the direct-current voltage falls below a predetermined voltage and for canceling the torque limiting when the voltage detection part detects that the direct-current voltage exceeds the predetermined voltage, described in claims.

Although in the above description, the voltage detection part 5 outputs the warning signal S2 to the master controller 12, and thus the torque limiting is performed through the master controller 12, the embodiment is not limited to this configuration. In other words, the voltage detection part 5 outputs the warning signal S2 directly to the control part 6, and thus the torque limiting may be performed without intervention of the master controller 12.

A position detector 13 optically or magnetically detects the motor position (such as a rotation angle) of the motor 10 to generate position data, and outputs it as a pulse signal S3 to the control part 6. The control part 6 takes in the pulse signal S3 as a motor position Pfb (see FIG. 2) that is fed back, and converts the motor position Pfb into a speed by a differential computation or the like and takes in it as a motor speed Vfb (see FIG. 2) that is fed back. The form of the position data output by the position detector 13 is not limited to a pulse signal, and there are various forms such as serial data and analog sine wave.

Figure 2:
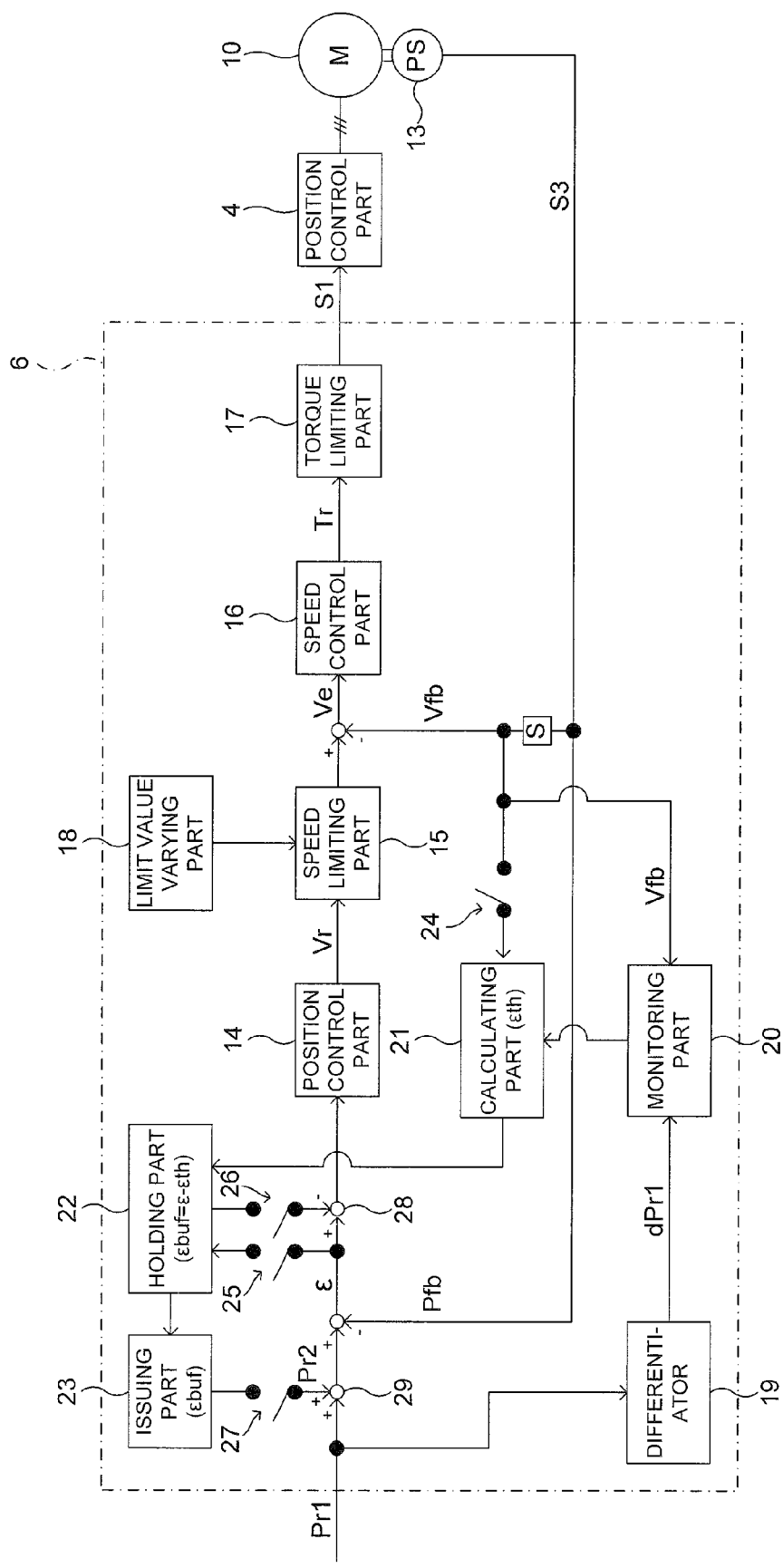
FIG. 2 is a block diagram showing a functional configuration of a control part at normal time.
Figure 3:
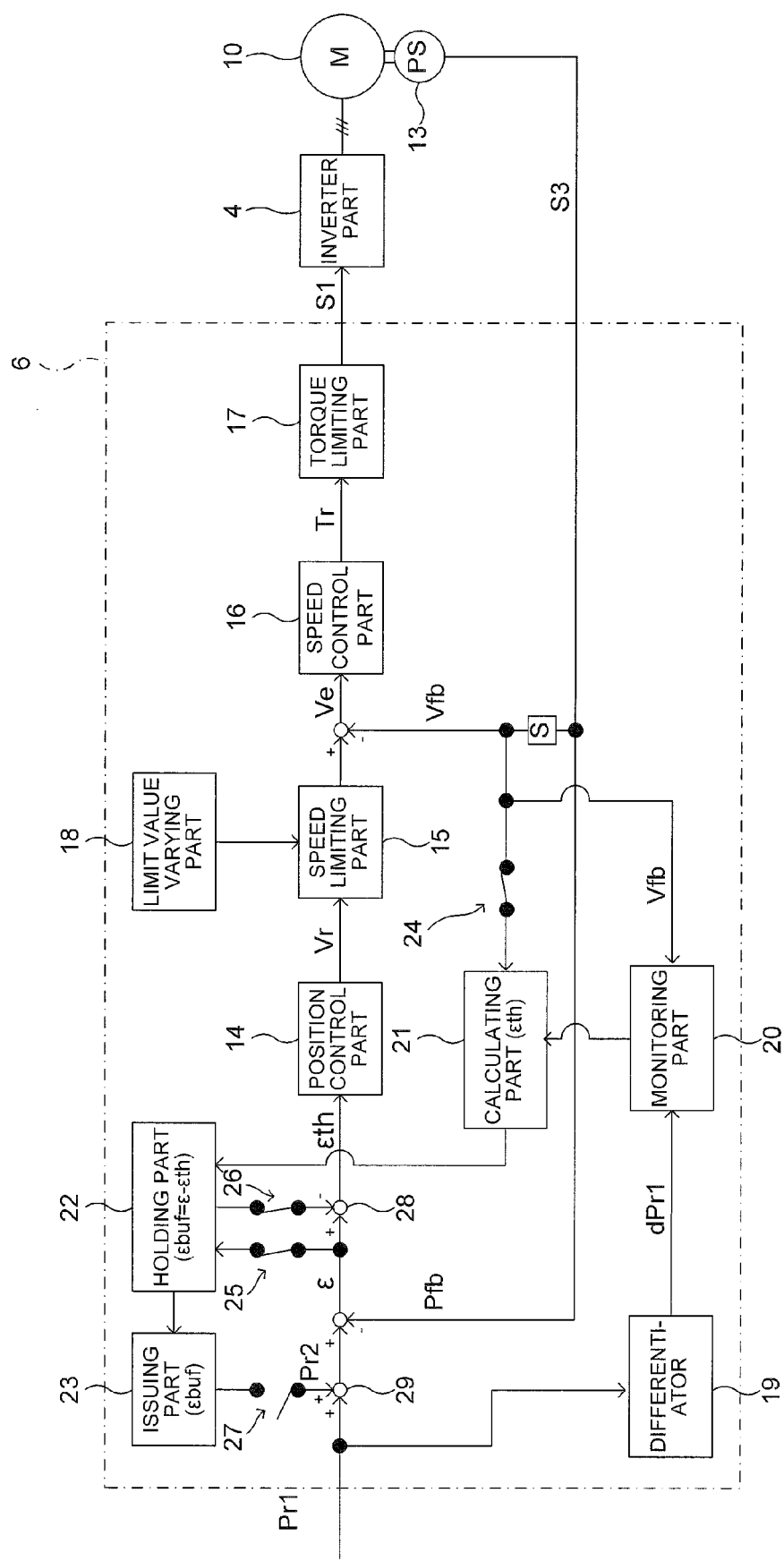
FIG. 3 is a block diagram showing the functional configuration of the control part immediately after a motor speed matches a first position command speed.
Figure 4:
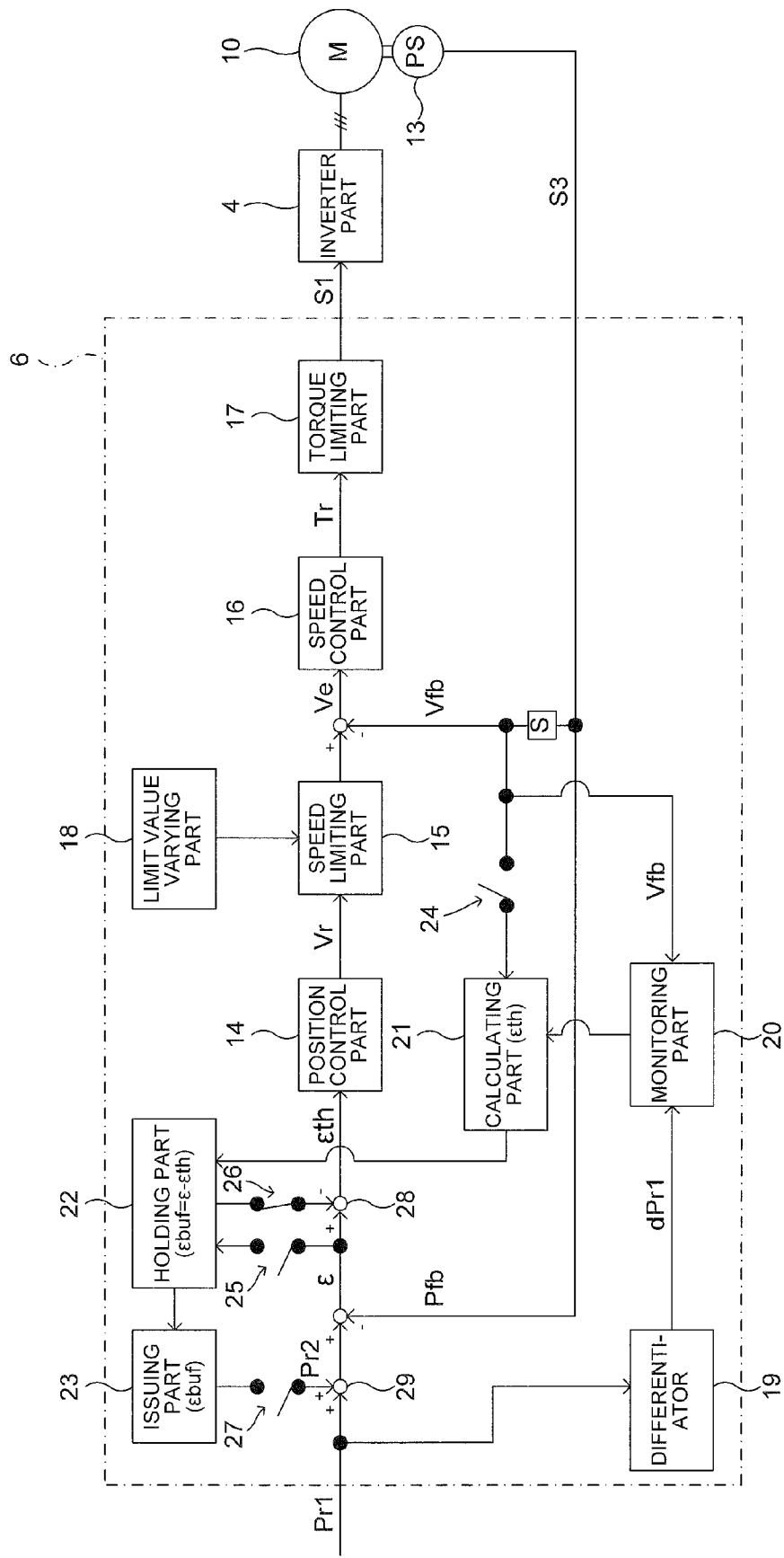
FIG. 4 is a block diagram showing the functional configuration of the control part after the motor speed matches the first position command speed until immediately before start of issuing of a second position command.
Figure 5:
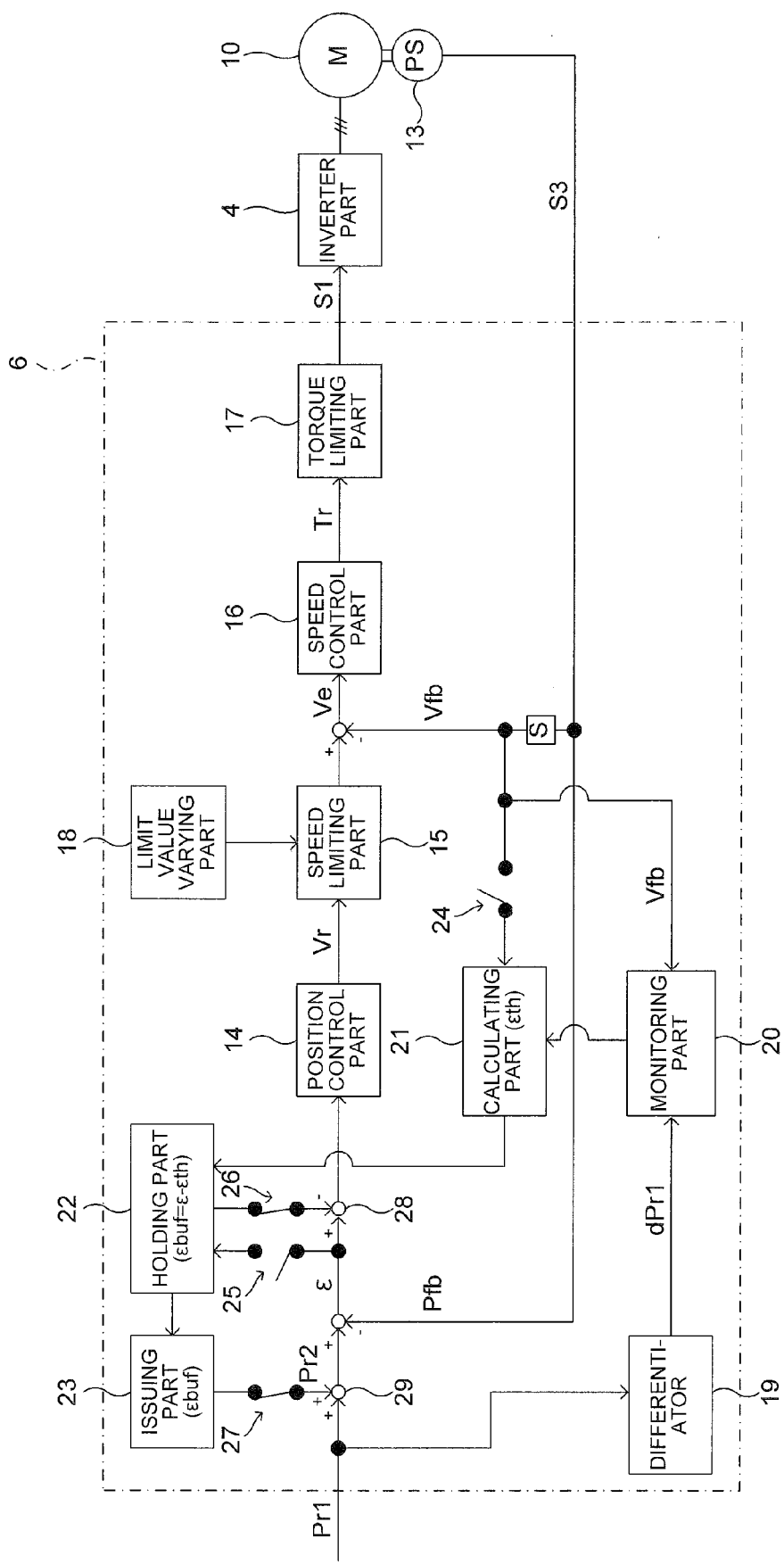
FIG. 5 is a block diagram showing the functional configuration of the control part after the start of issuing of the second position command until the completion of the issuing.

The functional configuration of the control part 6 will then be described with reference to FIGS. 2 to 5. FIG. 2 shows the functional configuration of the control part 6 at normal time (from a normal operation, to the start of the torque limiting, to the cancellation of the torque limiting and to the time when after the cancellation, the motor speed matches a first position command speed); FIG. 3 shows the functional configuration of the control part 6 immediately after the motor speed matches the first position command speed; FIG. 4 shows the functional configuration of the control part 6 after the motor speed matches the first position command speed until immediately before a second position command starts to be issued; and FIG. 5 shows the functional configuration of the control part 6 after the start of the issuing of the second position command until the completion of the issuing.

As shown in FIGS. 2 to 5, the control part 6 includes a position control part 14, a speed limiting part 15, a speed control part 16, a torque limiting part 17, a limit value varying part 18, a differentiator 19, a monitoring part 20, a calculating part 21, a holding part 22, an issuing part 23 and a plurality of switches 24 to 27.

The position control part 14 generates a speed command Vr based on a position deviation ε between the first position command Pr1 from the master controller 12 and the motor position Pfb fed back from the position detector 13. The speed limiting part 15 limits a command speed (hereinafter referred to as a "command speed Vr" as necessary) by the speed command Vr to a predetermined speed limit value Vlim or less. The speed limit value Vlim is set at an arbitrary value as a parameter, and can be varied by the limit value varying part 18. When the torque limiting, which will be described later, performed by the torque limiting part 17 is cancelled, the speed limiting function of the speed limiting part 15 becomes effectual whereas when the speed limit value Vlim (≅the motor speed Vfb) that has been varied after the cancellation of the torque limiting matches a first position command speed dPr1 that is a time differential value of the first position command Pr1, the speed limiting function becomes ineffectual. The speed limiting part 15 performs speed limiting when the command speed Vr is equal to or more than the speed limit value Vlim within this effectual period.

The speed control part 16 generates a torque command Tr based on a speed deviation Ve between the speed command Vr and the motor speed Vfb that is a difference value obtained by performing a differential computation or the like on the motor position Pfb fed back from the position detector 13. The torque limiting part 17 limits a command torque (hereinafter referred to as a "command torque Tr" as necessary) by the torque command Tr to a predetermined torque limit value Tlim or less. The torque limit value Tlim is set at an arbitrary value as a parameter. While the torque limiting signal described above is input from the master controller 12, the torque limiting function of the torque limiting part 17 becomes effectual. The torque limiting part 17 performs torque limiting when the command torque Tr is equal to or more than the torque limit value Tlim within this effectual period.

The torque command Tr from the speed control part 16 is converted into the control signal S1 described above, and is output to the inverter part 4. The control part 6 may include a torque control part (not shown). The torque control part converts the torque command Tr from the speed control part 16 into a current command, generates a voltage command from the current command and a motor current fed back and generates the control signal S1 based on the voltage command.

Figure 6:
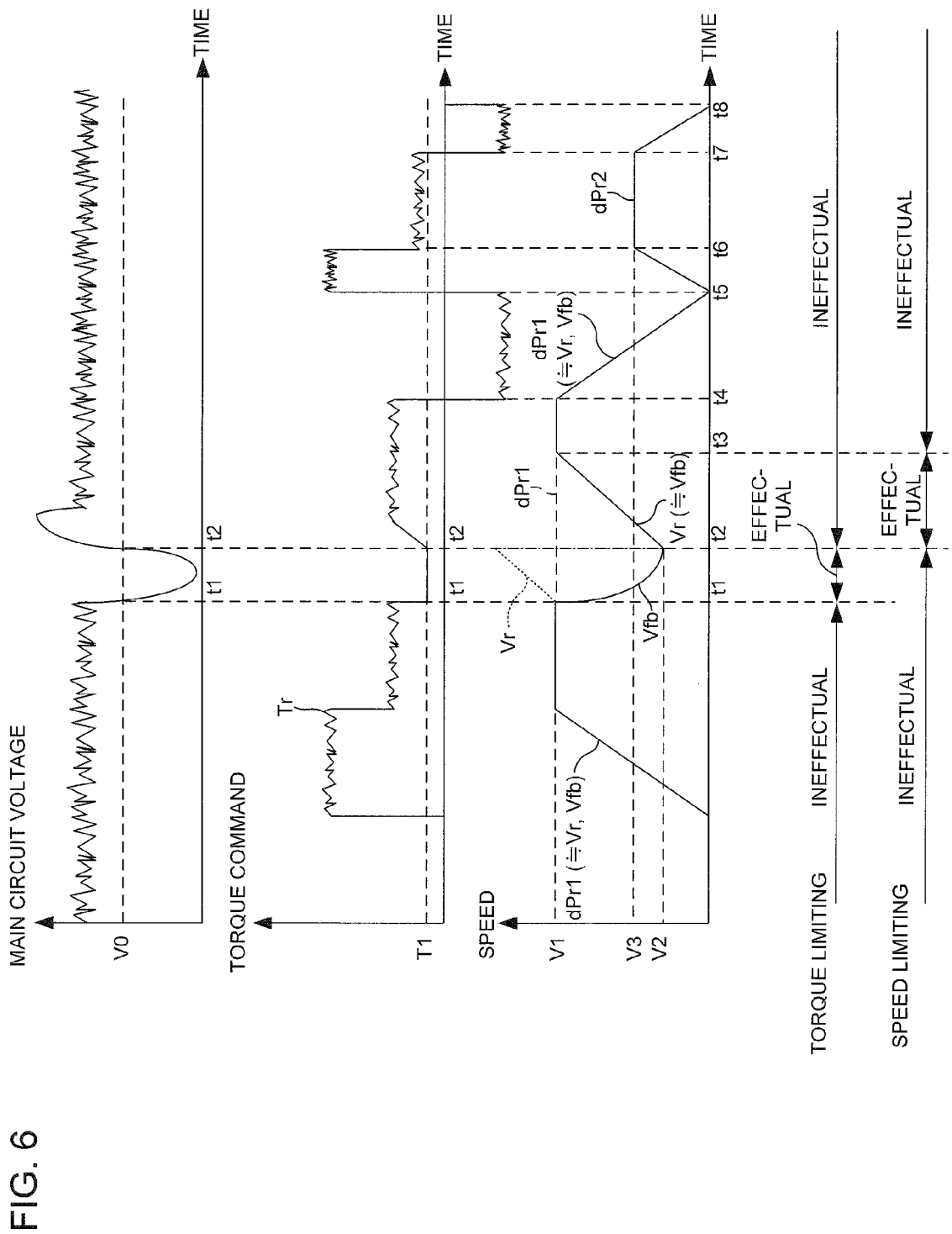
FIG. 6 is a time chart showing an example of an operation of the motor control device when a decrease in main circuit power source voltage occurs.

The limit value varying part 18 varies the speed limit value Vlim of the speed limiting part 15. The variable range and aspect are arbitrarily set, using, as parameters, for example, an upper limit value, a lower limit value, a variable time and the like. The variable aspect can be considered variously. In the present embodiment, as shown in FIG. 6, which will be described later, the limit value varying part 18 varies the speed limit value Vlim such that linear acceleration is achieved at a constant acceleration while the command speed Vr changes from a speed V2 that is a motor speed when the torque limiting is cancelled to the first position command speed dPr1.

The differentiator 19 inputs the first position command Pr1 from the master controller 12 to generate the first position command speed dPr1 that is a time differential value. The monitoring part 20 inputs the first position command speed dPr1 from the differentiator 19 and the motor speed Vfb, and monitors whether or not the motor speed Vfb matches the first position command speed dPr1. In order to start the issuing of a second position command dPr2 by the issuing part 23, the monitoring part 20 also monitors whether or not the issuing of the first position command dPr1 is completed (whether or not the first position command speed dPr1 is zero).

The issuing part 23 corresponds to an example of means for issuing, with a predetermined speed profile, a second position command corresponding to the accumulated position deviation held by the holding part after start of deceleration of the first position command speed, described in claims.

When after the cancellation of the torque limiting, it is detected by the monitoring part 20 that the motor speed Vfb matches the first position command speed dPr1, the calculating part 21 calculates a theoretical position deviation εth based on the motor speed Vfb and a position loop gain kp of the position control part 14. The theoretical position deviation εth can be expressed by the following formula.

$$\epsilon th = Vfb/kp \quad \text{(formula 1)}$$

As shown in FIG. 3, the switch 24 is closed immediately after it is detected by the monitoring part 20 that the motor speed Vfb matches the first position command speed dPr1, and is opened in the other cases. As a result, when the motor speed Vfb matches the first position command speed dPr1, the motor speed Vfb is input to the calculating part 21, and it becomes possible for the calculating part 21 to calculate the theoretical position deviation εth described above. The position loop gain kp is previously set and stored.

The holding part 22 is, for example, a buffer memory, and calculates and holds an accumulated position deviation εbuf that is the position deviation ε accumulated during the torque limiting and during the speed limiting. The accumulated position deviation εbuf can be expressed by the following formula based on the position deviation ε between the first position command Pr1 and the motor position Pfb and the theoretical position deviation εth calculated by the calculating part 21.

$$\epsilon buf = \epsilon - \epsilon th \quad \text{(formula 2)}$$

The holding part 22 corresponds to an example of means for calculating and holding an accumulated position deviation which is the position deviation accumulated at least during the torque limiting, described in claims.

As shown in FIG. 3, the switch 25 is closed immediately after it is detected by the monitoring part 20 that the motor speed Vfb matches the first position command speed dPr1, and is opened in the other cases. As a result, when the motor speed Vfb matches the first position command speed dPr1, the position deviation ε is input to the holding part 22, and it becomes possible for the holding part 22 to calculate the accumulated position deviation εbuf described above.

As shown in FIGS. 3 to 5, the switch 26 is closed immediately after it is detected by the monitoring part 20 that the motor speed Vfb matches the first position command speed dPr1, and remains in the closed state until the completion of the issuing of the second position command Pr2 by the issuing part 23. As a result, from immediately after the motor speed Vfb matches the first position command speed dPr1, a subtractor 28 subtracts, from the position deviation ε, the accumulated position deviation εbuf calculated by the holding part 22 that is the difference value between the position deviation ε and the theoretical position deviation εth calculated by the calculating part 21, and the theoretical position deviation εth (=ε−(ε−εth)) is input to the position control part 14 until the start of the issuing of the second position command Pr2 by the issuing part 23 (see FIGS. 3 and 4). Consequently, the speed command Vr generated by the position control part 14 substantially matches the first position command speed dPr1.

Hence, the calculating part 21 and the subtractor 28 function as a speed matching instruction part that is recited in the scope of claims.

Also, the calculating part 21 and the subtractor 28 correspond to an example of means for matching the speed command with a first position command speed, which is a time differential value of the first position command, when the motor speed matches the first position command speed after the cancellation of the torque limiting, described in claims.

When it is detected by the monitoring part 20 that the issuing of the first position command dPr1 is completed (the first position command speed dPr1 becomes zero), the issuing part 23 issues the second position command Pr2 corresponding to the accumulated position deviation εbuf held in the holding part 22 with a predetermined speed profile. Although the second position command Pr2 issued by the issuing part 23 is added by an adder 29 to the first position command Pr1, since in the present embodiment, the issuing of the first position command dPr1 is completed, the first position command dPr1 is zero. Thus, after the start of the issuing of the second position command Pr2, the position control part 14 generates the speed command Vr based on the position deviation ε between the second position command Pr2 and the motor position Pfb.

Figure 7:
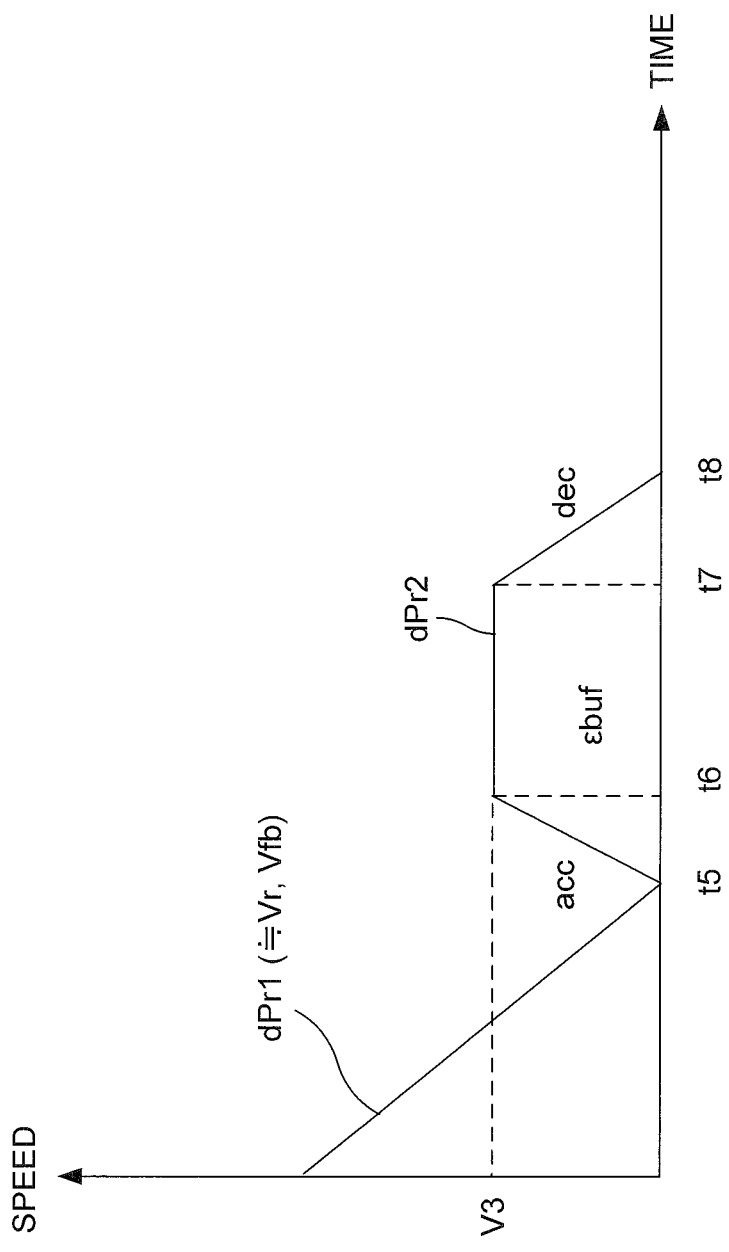
FIG. 7 is an illustrative diagram for illustrating a speed profile of the second position command.

The predetermined speed profile can be arbitrarily set using parameters such as a speed, an acceleration and a deceleration, and is previously set and stored. In the present embodiment, as shown in FIGS. 6 and 7, which will be described later, the predetermined speed profile is set at a speed profile in which the second position command speed dPr2 that is a time differential value of the second position command Pr2 is accelerated at a predetermined acceleration, becomes constant at a predetermined speed for only a predetermined time and is decelerated at a predetermined deceleration. A movement distance while the second position command Pr2 is issued with this speed profile is the accumulated position deviation εbuf. The speed profile is not limited to the speed profile described above, and various speed profiles can be considered. For example, in acceleration and deceleration, an acceleration and a deceleration may be not constant but varied or no constant speed period may be provided.

As shown in FIG. 5, the switch 27 is closed when it is detected by the monitoring part 20 that the issuing of the first position command dPr1 is completed. As a result, the second position command dPr2 can be issued by the issuing part 23. Thereafter, when the issuing of the second position command dPr2 is completed, the switch 27 is opened.

<Operation when a Decrease in Main Circuit Power Source Voltage Occurs>

An example of the operation of the motor control device 1 when a decrease in the direct-current voltage of the main circuit 11 caused by instantaneous power stop or the like will then be described with reference to FIGS. 6 and 7 and FIGS. 2 to 5 described previously. Here, a description will be given of a case where as shown in the first position command speed dPr1, the speed profile of the first position command Pr1 is acceleration, constant speed and deceleration and where a decrease in main circuit power source voltage occurs during this constant speed.

When it is detected by the voltage detection part 5 that the direct-current voltage of the main circuit 11 falls below a predetermined voltage V0 (time t1), as described above, the voltage detection part 5 generates the warning signal S2 and outputs it to the master controller 12, and the master controller 12 outputs a torque limiting signal to the torque limiting part 17. As a result, the torque limiting function of the torque limiting part 17 becomes effectual, and the torque limiting part 17 starts the torque limiting.

The torque limiting described above is performed, and thus the motor speed Vfb is reduced, and the command speed Vr is increased as the position deviation ϵ is increased. Until the time t1, the position command speed dPr1, the command speed Vr and the motor speed Vfb are substantially the same values.

Thereafter, when it is detected that the main circuit power source voltage is restored from the reduced voltage to exceed the predetermined voltage V0 (time t2), the voltage detection part 5 stops the output of the warning signal S2 to the master controller 12, and the master controller 12 stops the output of the torque limiting signal to the torque limiting part 17. As a result, the torque limiting function of the torque limiting part 17 becomes ineffectual, and the torque limiting part 17 cancels the torque limiting.

When the torque limiting by the torque limiting part 17 is cancelled, the speed limiting function of the speed limiting part 15 becomes effectual. Here, the limit value varying part 18 latches the speed limit value Vlim to a voltage V2 that is a motor speed when the torque limiting is cancelled, and the speed limiting part 15 starts the speed limiting. Thereafter, the limit value varying part 18 increases the speed limit value Vlim up to a speed V1 higher than the speed V2 at a constant rate. Consequently, as shown in FIG. 6, the limited command speed Vr is linearly accelerated from the speed V2 to the speed V1 at a constant acceleration. Then, when the limited command speed Vr (=speed limit value Vlim) matches the speed V1 (=first position command speed dPr1) (time t3), the speed limiting function of the speed limiting part 15 becomes ineffectual, and the speed limiting part 15 cancels the speed limiting.

As described above, until the time (time t3) when it is detected by the monitoring part 20 that the motor speed Vfb matches the first position command speed dPr1, as shown in FIG. 2, the switches 24 to 27 of the control part 6 are opened. Then, immediately after the motor speed Vfb matches the first position command speed dPr1, as shown in FIG. 3, the switches 24 to 26 are closed. As a result, the calculating part 21 calculates the theoretical position deviation ϵth based on the motor speed Vfb at this time (≅the first position command speed dPr1), and the theoretical position deviation ϵth is input to the holding part 22. On the other hand, the position deviation ϵ is input to the holding part 22, and the holding part 22 calculates and holds the accumulated position deviation ϵbuf that is the difference value between the position deviation ϵ and the theoretical position deviation ϵth.

Thereafter, as shown in FIG. 4, the switches 24 and 25 are opened, and only the switch 26 is in the closed state. The accumulated position deviation ϵbuf held in the holding part 22 is subtracted by the subtractor 28 from the position deviation ϵ, and the theoretical position deviation ϵth is input to the position control part 14. As a result, the speed command Vr generated by the position control part 14 substantially matches the first position command speed dPr1. Consequently, as shown in FIG. 6, after the motor speed Vfb matches the first position command speed dPr1 (time t3), the first position command speed dPr1 starts to be decelerated (time t4), and until the completion of the issuing of the first position command Pr1 (time t5), the command speed Vr substantially matches the first position command speed dPr1. In other words, the motor 10 is driven according to the first position command Pr1 during a time period from the time t3 to the time t5.

When it is detected by the monitoring part 20 that the issuing of the first position command dPr1 is completed (the first position command speed dPr1 becomes zero) (time t5), as shown in FIG. 5, the switch 27 is closed. As a result, the issuing part 23 issues the second position command Pr2 corresponding to the accumulated position deviation ϵbuf held in the holding part 22 with a predetermined speed profile. As described above, in the example shown in FIGS. 6 and 7, the issuing part 23 issues the second position command Pr2 so as to have a speed profile in which the second position command speed dPr2 is accelerated at a predetermined acceleration acc (time t5 to time t6), becomes constant at a predetermined speed V3 for only a predetermined time (time t6 to time t7) and is decelerated at a predetermined deceleration dec (time t7 to time t8). Consequently, the motor 10 is moved by only the position deviation ϵbuf accumulated during the torque limiting and during the speed limiting, and thus the motor 10 can be made to reach a target position. The acceleration acc, the speed V3, the deceleration dec and the like described above are arbitrarily set as parameters.

<Effects of the Embodiment>

As described above, in the motor control device 1 of the present embodiment, after the cancellation of the torque limiting, when the motor speed Vfb matches the first position command speed dPr1, the calculating part 21 and the subtractor 28 which function as the speed matching instruction part match the speed command Vr input to the speed control part 16 with the first position command speed dPr1. As a result, even if at the time of the torque limiting, the position deviation ϵ is increased, and at the time of cancellation of the torque limiting, the position control part 14 generates an excessive speed command Vr corresponding to the accumulated position deviation ϵbuf that is the increased position deviation, since the speed command Vr is made to match with the first position command speed dPr1, it is possible to prevent the motor speed Vfb from exceeding the first position command speed dPr1. Hence, the overshooting of the motor 10 is reduced and a stop caused by the generation of an overspeed alarm or the like can be avoid, and thus it is possible to prevent the motor 10 from being stopped when the main circuit power source voltage is restored.

In the present embodiment, the holding part 22 calculates and holds the accumulated position deviation ϵbuf, and after the completion of the issuing of the first position command Pr1, the issuing part 23 issues, with a predetermined speed profile, the second position command Pr2 corresponding to the accumulated position deviation ϵbuf which is held. As a result, it is possible to complement an increase in the position deviation ϵ caused by limiting the torque when the main circuit power source voltage is reduced after the completion of the issuing of the first position command Pr1, and thus it is possible to locate the motor 10 in the target position highly accurately.

In the present embodiment, in particular, the control part 6 further includes the speed limiting part 15 that variably limits the speed command Vr after the cancellation of the torque limiting. As a result, even if at the time of the torque limiting and at the time of the speed limiting, the position deviation ϵ is increased, and at the time of cancellation of the speed limiting, the position control part 14 generates an excessive speed command Vr corresponding to the accumulated position deviation ϵbuf that is the increased position deviation, it is possible to further prevent the motor speed Vfb from exceeding the first position command speed dPr1. Hence, the overshooting of the motor 10 is further reduced and a stop caused by the generation of an overspeed alarm or the like can be avoided, and thus it is possible to prevent the motor 10 from being stopped when the main circuit power source voltage is restored. Moreover, the motor 10 is prevented from being rapidly accelerated when the main circuit power source voltage is restored, and thus it is possible to reduce a shock to the device and to smooth the operation of the motor 10.

In the present embodiment, in particular, since the issuing of the second position command Pr2 is started after the completion of the issuing of the first position command Pr1, and thus the control part 6 can separately process the first position command Pr1 and the second position command Pr2, as compared with the case where the first position command Pr1 and the second position command Pr2 are processed by being added, it is possible to reduce a load on computation processing. Since as a result of this, it is possible to reduce a computation error, it is possible to locate the motor 10 in the target position highly accurately.

In the present embodiment, in particular, since the issuing part 23 issues the second position command Pr2 so as to have the speed profile in which the second position command speed dPr2 is accelerated at a predetermined acceleration, becomes constant at a predetermined speed and is decelerated at a predetermined deceleration, it is possible to prevent the motor 10 from being rapidly accelerated/decelerated at the time of the issuing, and thus it is possible to make the operation of the motor 10 smooth and to make the motor 10 reach the target position.

<Variations>

The present disclosure is not limited to the embodiment described above, and various variations are possible without departing from its spirit and technical idea. Such variations will be sequentially described below.

(1) In a case where the issuing is started in the middle of the deceleration of the first position command speed (a constant speed period is included)

Although in the embodiment described above, the issuing of the second position command Pr2 is started after the completion of the issuing of the first position command Pr1, the start timing of the issuing may be in the middle of the deceleration of the first position command speed dPr1. An example of this case will be described with reference to FIGS. 8, 9A and 9B.

Figure 8:
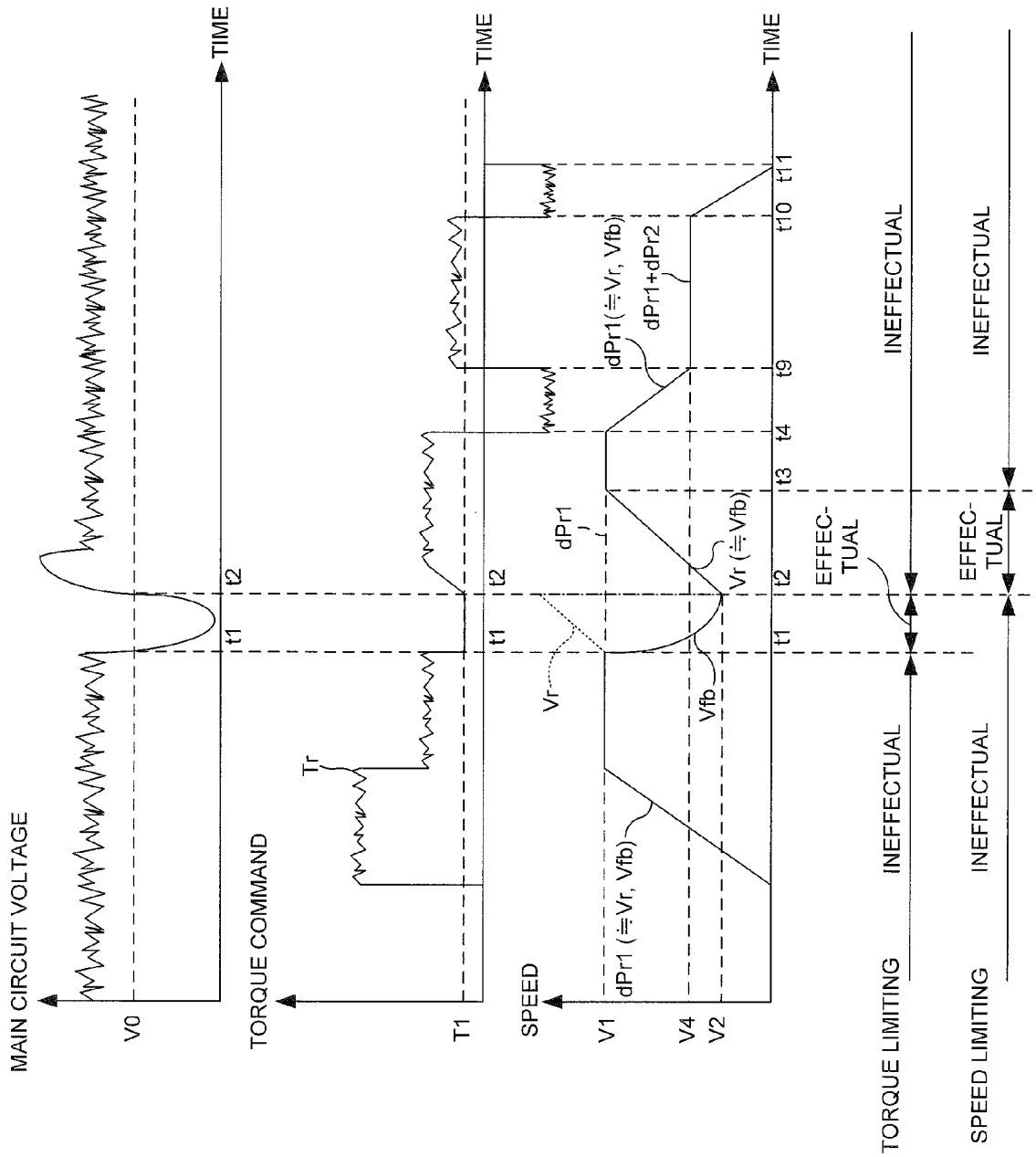
FIG. 8 is a time chart showing an example of the operation of the motor control device when the issuing is started in the middle of the deceleration of the first position command speed and a decrease in main circuit power source voltage occurs in a variation having a constant speed period.

As shown in FIG. 8, after the start of the deceleration of the first position command speed dPr1 (time t4), the issuing part 23 starts the issuing of the second position command Pr2 in the middle of the deceleration, that is, in this example, at a point of time (time t9) when the first position command speed dPr1 is decelerated from the speed V1 to the speed V4. Specifically, when it is detected by the monitoring part 20 that the first position command speed dPr1 becomes the speed V4, as shown in FIG. 5 described above, the switch 27 is closed, and the issuing part 23 starts the issuing. The operation of the control part 6 is the same as in FIGS. 2 to 5 in the embodiment described above except that the start timing of the issuing is different. After the start of the issuing of the second position command Pr2, the position control part 14 generates the speed command Vr based on the position deviation ∈ between the first position command Pr1 and the second position command Pr2 which are added and the motor position Pfb.

Figures 9A, 9B:
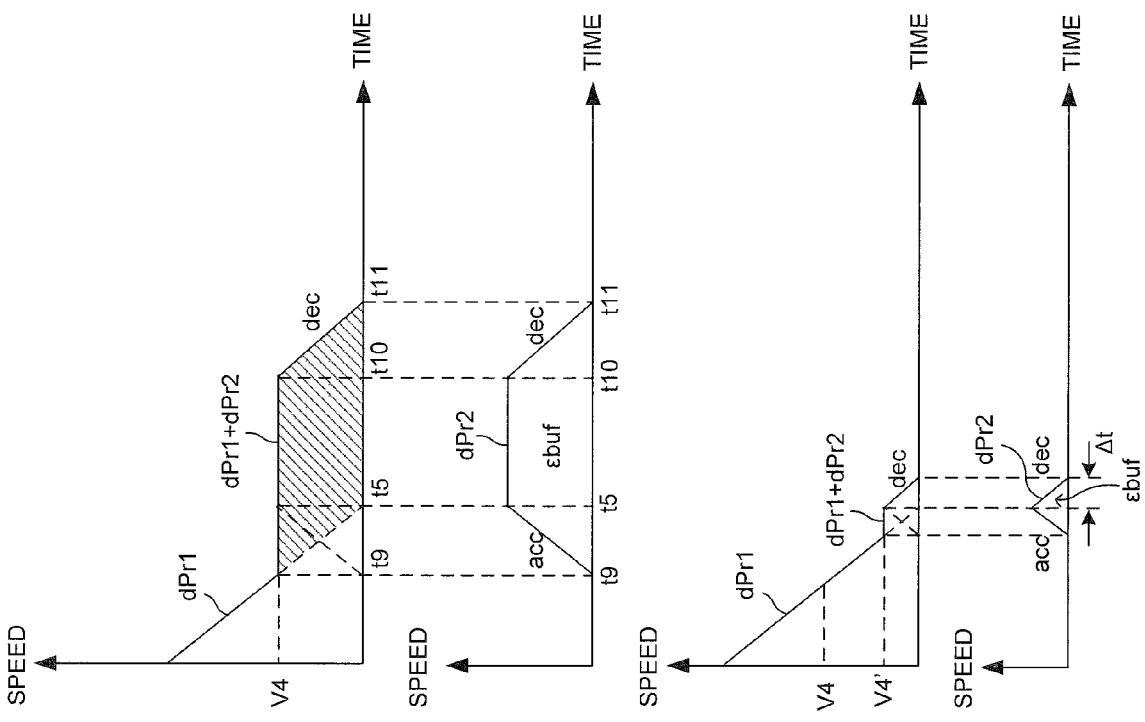
FIG. 9A is an illustrative diagram for illustrating a speed profile of the second position command when the issuing is started in the middle of the deceleration of the first position command speed in the variation having a constant speed period.
FIG. 9B is an illustrative diagram for illustrating a speed profile of the second position command when the issuing is started in the middle of the deceleration of the first position command speed in the variation having a constant speed period.

In the present variation, a constant speed period is provided in the speed profile of the second position command Pr2. An example of the setting of this speed profile is shown in FIG. 9A. The speed V4 in the constant speed period and the deceleration dec in the subsequent deceleration period are set at arbitrary values as parameters. A time t10 and a time t11 are set such that a movement distance (the area of a diagonally shaded part) while the first position command Pr1 and the second position command Pr2 are issued according to the speed V4 and the deceleration dec which have been set matches the accumulated position deviation ∈buf. Consequently, the issuing part 23 issues the second position command Pr2 so as to have the speed profile in which the first position command speed dPr1 in the middle of the deceleration reaches the speed V4 (time t9), then becomes constant at the speed V4 for a predetermined time (time t9 to time t10) and then is decelerated at a predetermined deceleration dec (time t10 to t11).

Although FIG. 9A shows, as an example, the case where the deceleration dec of the second position command speed dPr2 is equal to the deceleration of the first position command speed dPr1, they may be made to differ from each other.

In a case where the accumulated position deviation ∈buf is small, when a constant speed and deceleration operation is performed from the specified speed V4, the movement distance exceeds the accumulated position deviation ∈buf, with the result that the target position may be passed. In this case, it is preferable to cope with this problem by calculating, instead of the specified speed V4, a speed V4' with the following formula.

$$V4'=(dec \times \epsilon buf)^{0.5} \quad \text{(formula 3)}$$

The derivation of formula 3 above will be described with reference to FIG. 9B. When it is assumed that the acceleration time or the deceleration time of the second position command speed dPr2 is Δt, the area of the accumulated position deviation ∈buf is expressed by:

$$\epsilon buf=(2 \times \Delta t \times V4')/2=\Delta t \times V4' \quad \text{(formula 4)}$$

Here, the deceleration dec can be expressed as follow:

$$dec=V4'/\Delta t \therefore \Delta t=V4'/dec \quad \text{(formula 5)}$$

When formula 5 is substituted into formula 4, $$\epsilon buf=(V4'/dec) \times V4'=V4'^2/dec \quad \text{(formula 6)}$$

When formula 6 is organized for V4', $$V4'=(dec \times \epsilon buf)^{0.5}.$$

Whether or not the movement distance exceeds the accumulated position deviation ∈buf due to the specified speed V4 is preferably determined by, for example, the following condition.

$$\epsilon buf < V4^2/dec \quad \text{(formula 7)}$$

In other words, when the accumulated position deviation ∈buf is equal to or more than (V4²/dec), a speed profile based on the specified speed V4 is set whereas when the accumulated position deviation ∈buf is less than (V4²/dec), a speed profile based on V4' according to formula 3 above is set.

According to the present variation described above, since the issuing part 23 starts the issuing of the second position command Pr2 in the middle of the deceleration of the first position command speed dPr1, and the constant speed period is provided in the speed profile after the start of the issuing of the second position command Pr2, it is possible to make the operation of the motor 10 smooth and to make the motor 10 reach the target position.

(2) In a case where the issuing is started in the middle of the deceleration of the first position command speed (only a deceleration period)

Although in the variation (1) described above, the constant period is provided in the speed profile of the second position command Pr2, deceleration may be performed at a predetermined deceleration without provision of a constant period. An example of this case will be described with reference to FIGS. 10 to 12.

Figure 10:
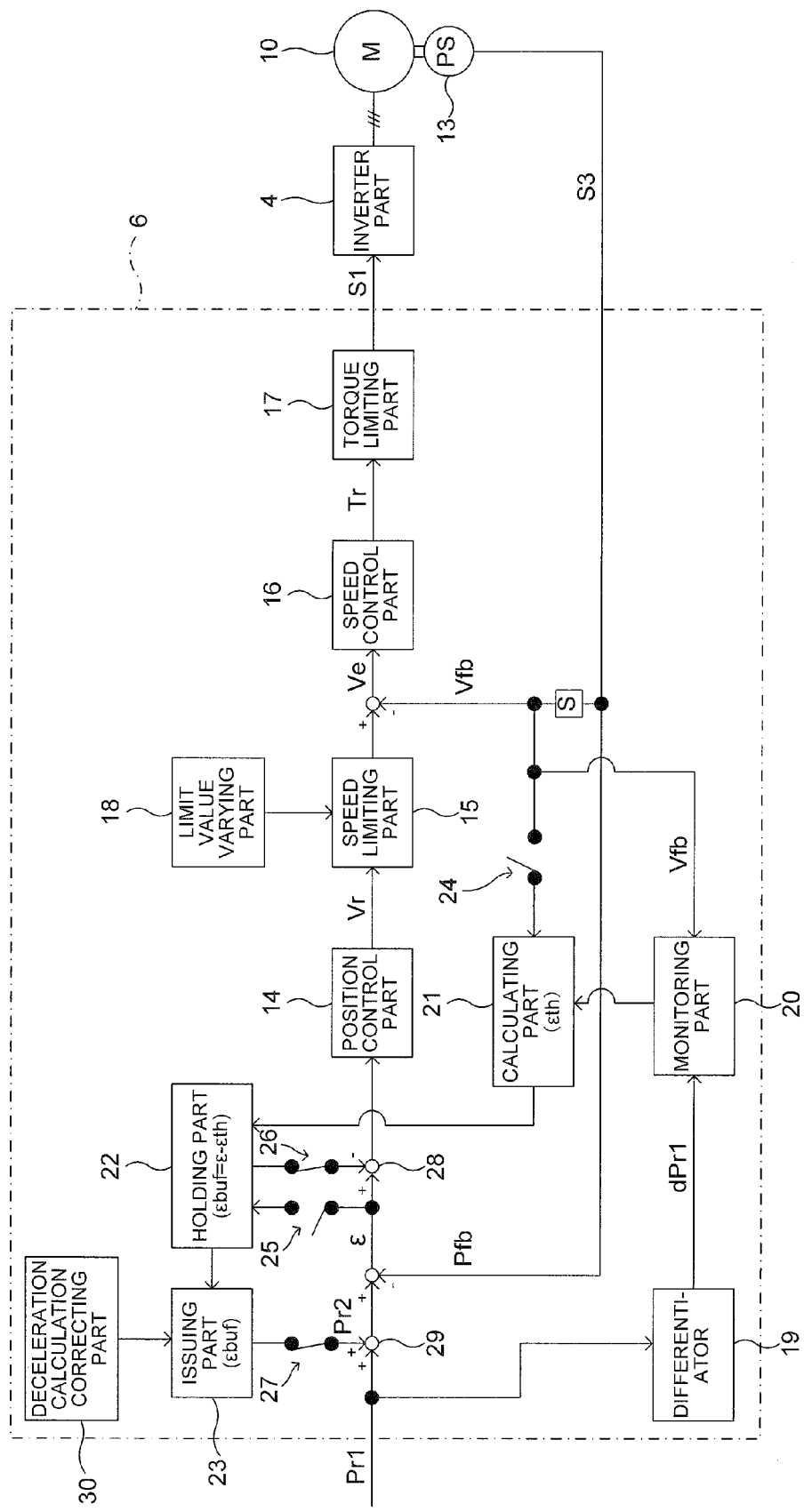
FIG. 10 is a block diagram showing the functional configuration of the control part when the issuing is started in the middle of the deceleration of the first position command speed and after the start of the issuing of the second position command until the completion of the issuing in a variation having only a deceleration period.

As shown in FIG. 10, the control part 6 of the present variation includes a deceleration calculation correcting part 30. The deceleration calculation correcting part 30 calculates a new deceleration when it is detected by the monitoring part 20 that the first position command speed dPr1 is decelerated to a predetermined speed, and the issuing part 23 starts the issuing of the second position command Pr2. When the issuing of the first position command Pr1 is completed, the deceleration calculation correcting part 30 corrects, as necessary the deceleration in the speed profile based on the accumulated position deviation ϵbuf at the time of the completion of the issuing. The configuration and the operation of the control part 6 other than this are the same as in FIGS. 2 to 5 described above. The deceleration calculation correcting part 30 corresponds to an example of a deceleration correcting part recited in the scope of claims.

Figure 11:
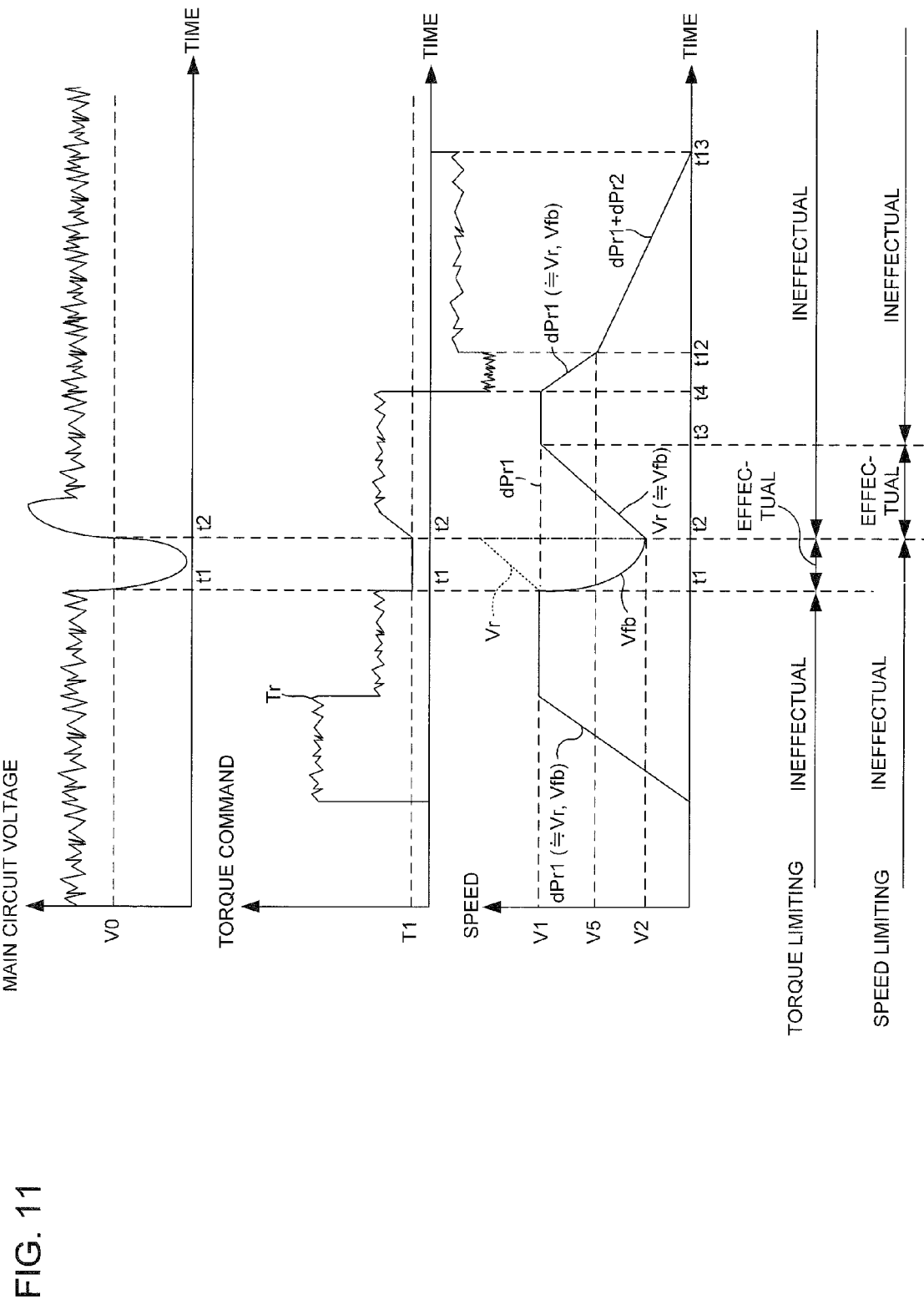
FIG. 11 is a time chart showing an example of the operation of the motor control device when the issuing is started in the middle of the deceleration of the first position command speed and a decrease in main circuit power source voltage occurs in the variation having only a deceleration period.

As shown in FIG. 11, after the start of the deceleration of the first position command speed dPr1 (time t4), in the middle of the deceleration, that is, in this example, at the time when the first position command speed dPr1 is decelerated from the speed V1 to a speed V5 (time t12), the issuing part 23 starts the issuing of the second position command Pr2, and completes the issuing while the sum of the first position command speed dPr1 and the second position command speed dPr2 is decelerated at a predetermined deceleration (time t13). Here, the issuing of the second position command Pr2 is performed according to the deceleration calculated by the deceleration calculation correcting part 30. After the start of the issuing of the second position command Pr2, the position control part 14 generates the speed command Vr based on the position deviation ϵ between the first position command Pr1 and the second position command Pr2 that are added and the motor position Pfb.

Figure 12:
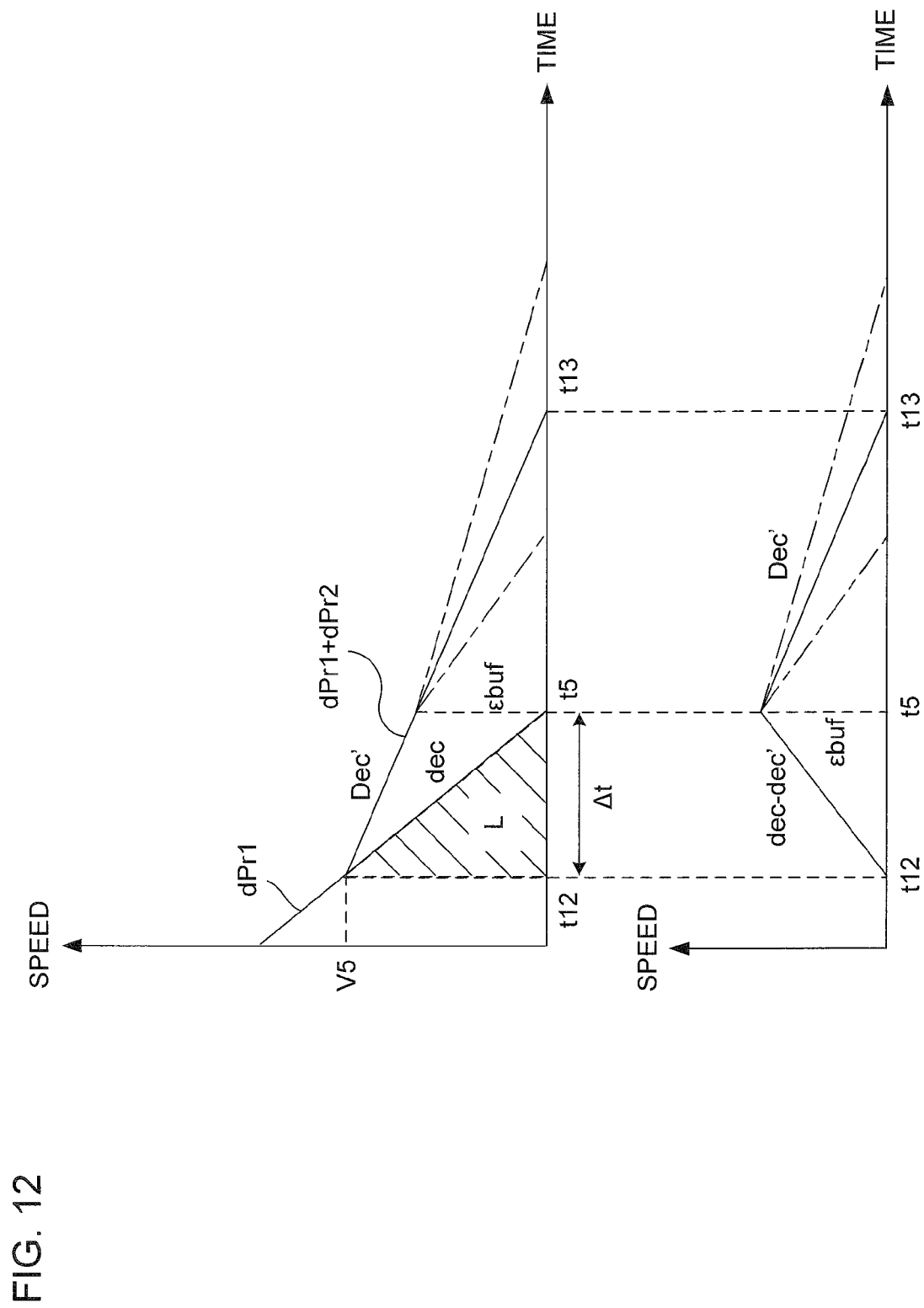
FIG. 12 is an illustrative diagram for illustrating a speed profile of the second position command when the issuing is started in the middle of the deceleration of the first position command speed in the variation having only a deceleration period.

An example of the setting of the speed profile in the present variation is shown in FIG. 12. The speed V5 is previously set at an arbitrary value as a parameter. When it is detected by the monitoring part 20 that the first position command speed dPr1 is decelerated to the speed V5 which is set, the deceleration calculation correcting part 30 calculates a new deceleration dec' in the following procedure. The deceleration calculation correcting part 30 first calculates the deceleration dec of the first position command speed dPr1 from a difference between the previous command and the command of this time issued from the issuing part 23. Then, the deceleration calculation correcting part 30 calculates a deceleration distance L (the area of a diagonally shaded part) from the calculated deceleration dec based on the following formula.

$$L = (1/2) \times \Delta t \times V5 \quad \text{(formula 8)}$$
$$= (1/2) \times (V5/dec) \times V5$$
$$= (1/2) \times (V5^2/dec)$$

Then, the deceleration calculation correcting part 30 calculates a deceleration dec' from the calculated deceleration distance L and the accumulated position deviation ϵbuf held in the holding part 22 based on the following formula.

$$dec' = (1/2) \times (V5^2/(L+\epsilon buf)) \quad \text{(formula 9)}$$

Formula 9 can be derived by organizing formula 8 for dec and substituting (L+ϵbuf) for L in the present formula. According to the calculated deceleration dec', the movement distance during which the first position command Pr1 and the second position command Pr2 are issued matches the sum of the deceleration distance L and the accumulated position deviation ϵbuf.

When an error occurs in the deceleration dec and the deceleration distance L described above, a position displacement is produced with respect to the target position. When the position displacement described above is expected, the deceleration calculation correcting part 30 may recalculate the deceleration dec' at the time when the issuing of the first position command Pr1 is completed (time t5) to make a correction. The recalculation of the deceleration dec' is performed based on, for example, the following formula.

$$dec' = (1/2) \times (V5^2/\epsilon buf') \quad \text{(formula 10)}$$

Here, ϵbuf' is the accumulated position deviation when the issuing of the first position command Pr1 is completed. An example of the deceleration dec' that is corrected in this way is indicated by a dashed line in FIG. 12.

According to the present variation described above, the issuing part 23 starts the issuing of the second position command Pr2 in the middle of the deceleration of the first position command speed Pr1, and sets only deceleration in the speed profile after the start of the issuing of the second position command Pr2. As a result, although the deceleration is varied (decreased) before and after the start of the issuing of the second position command Pr2, since it is possible to issue the second position command Pr2 while the decelerated state is maintained, a shock to the motor 10 at the time of the start of the issuing is reduced, and thus it is possible to make the operation of the motor 10 smooth and to make the motor 10 reach the target position. Moreover, since the deceleration dec' is corrected by the deceleration calculation correcting part 30, even if an error occurs in the calculation of the deceleration dec or the deceleration distance L, it is possible to prevent a position displacement with respect to the target position, and thus it is possible to enhance the accuracy of the locating.

(3) In a case where the issuing is started simultaneously with the start of the deceleration of the first position command speed Although in the variations (1) and (2) described above, the issuing is started in the middle of the deceleration of the first position command speed dPr1, the issuing may be started simultaneously with the start of the deceleration of the first position command speed dPr1. An example of this case will be described with reference to FIGS. 13 and 14.

The configuration of the control part 6 in the present variation is the same as shown in FIG. 10 described above, and includes the deceleration calculation correcting part 30. The deceleration calculation correcting part 30 calculates a new deceleration when it is detected by the monitoring part 20 that the deceleration of the first position command speed dPr1 is started, and the issuing part 23 starts the issuing of the second position command Pr2. The present variation is the same as what has been described previously in that the deceleration calculation correcting part 30 corrects, as necessary, the deceleration of the speed profile.

Figure 13:
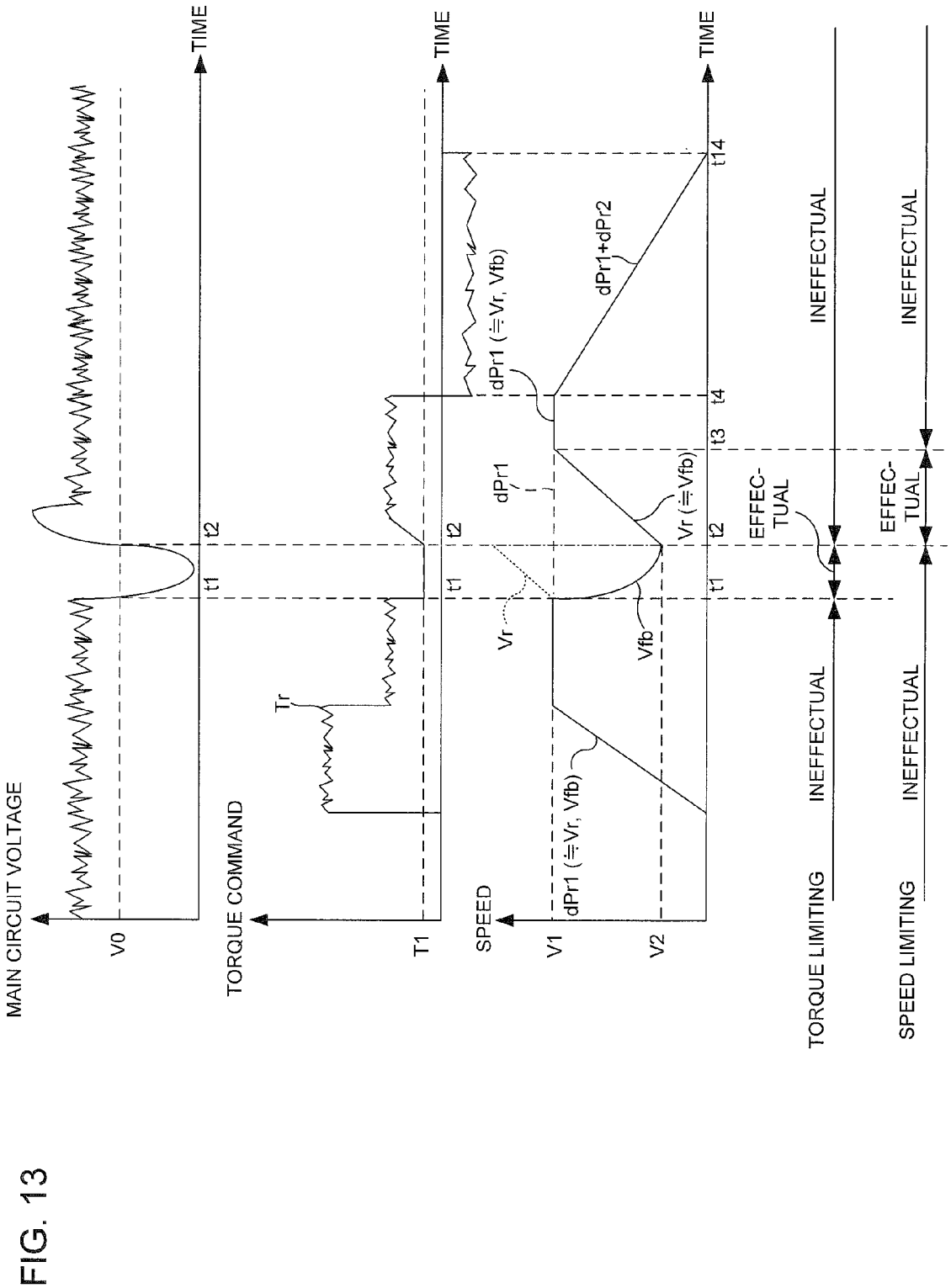
FIG. 13 is a time chart showing an example of the operation of the motor control device when a decrease in main circuit power source voltage occurs in a variation where the issuing is started simultaneously with the start of the deceleration of the first position command speed.

As shown in FIG. 13, when the deceleration of the first position command speed dPr1 is started (time t4), the issuing part 23 starts the issuing of the second position command Pr2, and completes the issuing while the sum of the first position command speed dPr1 and the second position command speed dPr2 is decelerated at a predetermined deceleration (time t14). Here, the issuing of the second position command Pr2 is performed according to the deceleration dec' calculated by the deceleration calculation correcting part 30.

Figure 14:
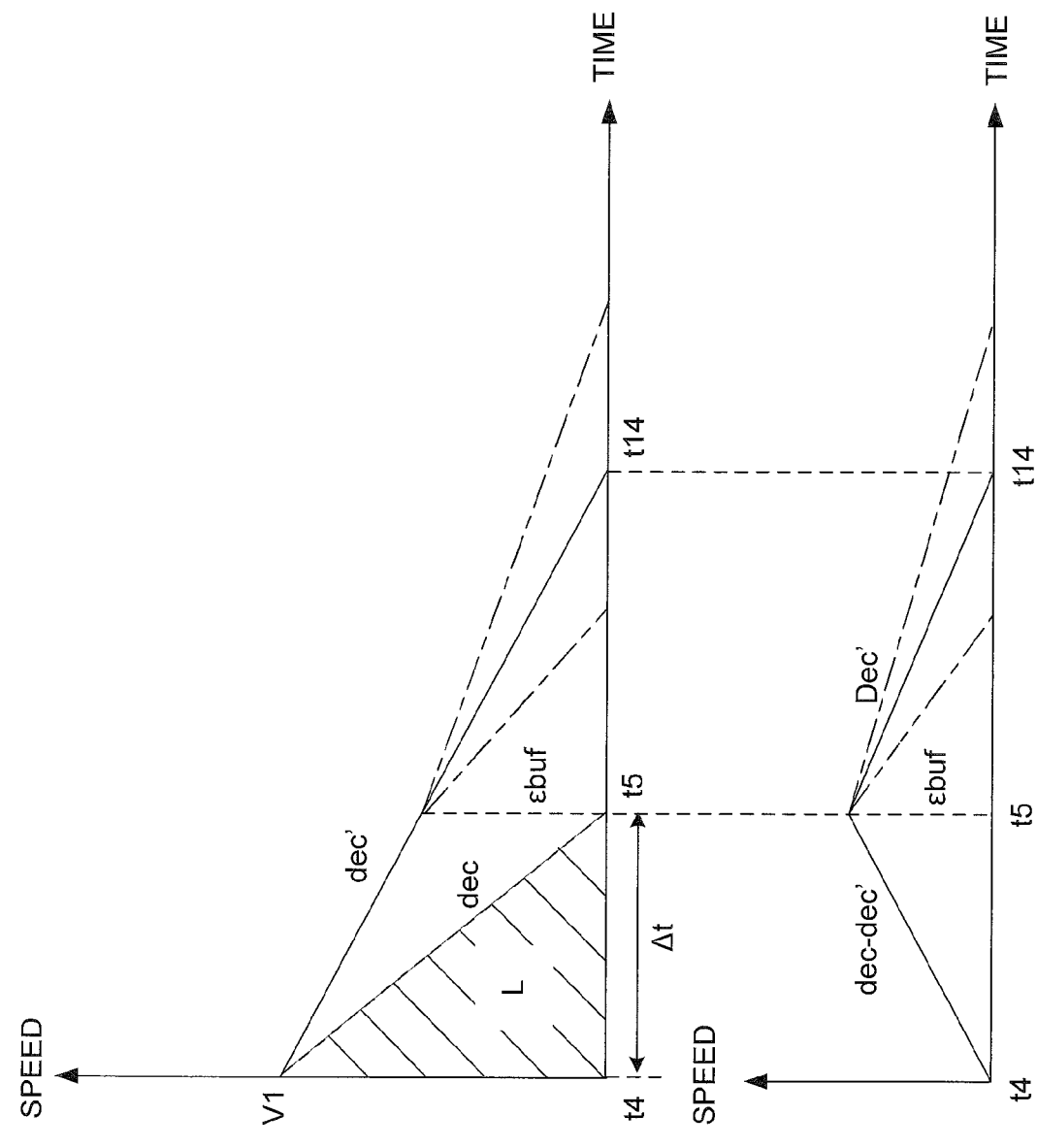
FIG. 14 is an illustrative diagram for illustrating a speed profile of the second position command in the variation where the issuing is started simultaneously with the start of the deceleration of the first position command speed.

An example of the setting of the speed profile in the present variation is shown in FIG. 14. A method of calculating the deceleration dec' by the deceleration calculation correcting part 30 is the same as in the variation (2) described above. However, in the present variation, the calculation timing of the deceleration dec' is at the time when the deceleration of the first position command speed dPr1 is started or immediately after the time. A method of correcting the deceleration dec' by the deceleration calculation correcting part 30 when a position displacement is expected is also the same as in the variation (2) described above.

According to the present variation described above, the issuing part 23 starts the issuing of the second position command Pr2 substantially simultaneously with the start of the deceleration of the first position command speed dPr1, and thereafter the deceleration is constant (no variation in deceleration), and thus it is possible to make the operation of the motor 10 more smooth and to make the motor 10 reach the target position.

When the start timing of the issuing of the second position command Pr2 is after the start of the deceleration of the first position command speed dPr1, it is possible to perform the issuing such that the motor speed Vfb does not exceed the first position command speed dPr1.

(4) In a case where the speed limiting is not performed

Although in the above description, the control part 6 includes the speed limiting part 15, and the speed limiting is performed when the torque limiting is cancelled, the speed liming is not necessarily needed. In other words, the control part 6 may be configured so as not to include the speed limiting part 15 and the limit value varying part 18. Even in this case, since the speed command Vr is made to match the first position command speed dPr1 immediately after the motor speed Vfb matches the first position command speed dPr1 after the cancellation of the torque limiting, the overshooting of the motor 10 is reduced, and thus it is possible to avoid a stop caused by the occurrence of an overspeed alarm or the like, with the result that it is possible to prevent the motor 10 from being stopped when the main circuit power source voltage is restored. In this case, the accumulated position deviation $\epsilon$buf is the position deviation $\epsilon$ accumulated during the torque limiting.

Instead of what has been described above, the methods in the embodiment and the variations described above may be combined and utilized as necessary.

Although not illustrated, various modifications are added and performed without departing from its spirit.

What is claimed is:

1. A motor control device comprising:
a main circuit that includes a converter configured to convert an alternating-current from an alternating-current power source into a direct-current power, a smoothing capacitor, and an inverter configured to convert the direct-current power into an alternating-current power to drive a motor;
a voltage detector configured to detect a direct-current voltage of the main circuit; and
a controller that includes a position controller configured to generate a speed command based on a position deviation, $\epsilon$, between a first position command from a master controller and a motor position, and a speed controller configured to generate a torque command based on a speed deviation between the speed command and a motor speed and is configured to control the inverter based on the torque command,
the controller including:
a torque limiter configured to start torque limiting which limits a command torque by the torque command to a predetermined torque or less when the voltage detector detects that the direct-current voltage falls below a predetermined voltage and to cancel the torque limiting when the voltage detector detects that the direct-current voltage exceeds the predetermined voltage; and
a speed matching instruction part configured to match the speed command with a first position command speed, which is a time differential value of the first position command, by inputting a theoretical position deviation, $\epsilon$th, to the position controller when the motor speed matches the first position command speed after the cancellation of the torque limiting, the theoretical position deviation being defined by a formula:

$$\epsilon th = \epsilon - (\epsilon - \epsilon th),$$

the theoretical position deviation being based on the motor speed.

2. A motor control device comprising:
a main circuit that includes a converter configured to convert an alternating-current from an alternating-current power source into a direct-current power, a smoothing capacitor, and an inverter configured to convert the direct-current power into an alternating-current power to drive a motor;
a voltage detector configured to detect a direct-current voltage of the main circuit; and
a controller that includes a position controller configured to generate a sped command based on a position deviation between a first position command from a master controller and a motor position, and a speed controller configured to generate a torque command based on a speed deviation between the speed command and a motor speed and is configured to control the inverter based on the torque command,
the controller including:
a torque limiter configured to start torque limiting which limits a command torque by the torque command to a predetermined torque or less when the voltage detector detects that the direct-current voltage falls below a predetermined voltage and to cancel the torque limiting when the voltage detector detects that the direct-current voltage exceeds the predetermined voltage;
a speed matching instruction part configured to match the speed command with a first position command speed, which is a time differential value of the first position command, when the motor speed matches the first position command speed after the cancellation of the torque limiting;
a holding part configured to calculate and hold an accumulated position deviation which is the position deviation accumulated at least during the torque limiting; and
an issuing part configured to issue, with a predetermined speed profile, a second position command corresponding to the accumulated position deviation held by the holding part after start of deceleration of the first position command speed.

3. The motor control device according to claim 2, further comprising
a speed limiter configured to start speed limiting which limits the speed command to a speed limit value or less when the torque limiter cancels the torque limiting, to vary the speed limit value such that the speed command is accelerated at a predetermined acceleration from the motor speed at a time of the cancellation of the torque limiting, and to cancel the speed limiting when the speed limit value matches the first position command speed, wherein
the holding part calculates and holds the accumulated position deviation which is the position deviation accumulated during the torque limiting and during the speed limiting.

4. The motor control device according to claim 3, wherein:
the speed matching instruction part includes:
a calculator configured to calculate a theoretical position deviation based on the motor speed and a position loop gain of the position controller when the motor speed matches the first position command speed after the cancellation of the torque limiting; and
a subtractor configured to subtract, from the position deviation, the accumulated position deviation calculated by the holding part which is a difference value between the position deviation and the theoretical position deviation calculated by the calculator.

5. The motor control device according to claim 4, wherein:
the issuing part starts issuing of the second position command after completion of issuing of the first position command, and
the position controller generates, after start of issuing of the second position command, the speed command based on a position deviation between the second position command and the motor position.

6. The motor control device according to claim 5, wherein:
the issuing part issues the second position command so as to have the speed profile where a second position command speed which is a time differential value of the second position command is accelerated at a predetermined acceleration, becomes constant at a predetermined speed and is decelerated at a predetermined deceleration.

7. The motor control device according to claim 4, wherein:
the issuing part starts issuing of the second position command in middle of deceleration of the first position command speed, and
the position controller generates, after start of issuing of the second position command, the speed command based on the position deviation between the first position command and the second position command which are added and the motor position.

8. The motor control device according to claim 7, wherein:
the issuing part issues the second position command so as to have the speed profile where the first position command speed in middle of deceleration reaches a predetermined speed, thereafter becomes constant at the predetermined speed and is decelerated at a predetermined deceleration.

9. The motor control device according to claim 7, wherein:
the issuing part issues the second position command so as to have the speed profile where the first position command speed in middle of deceleration reaches a predetermined speed, and is thereafter decelerated at a predetermined deceleration.

10. The motor control device according to claim 4, wherein:
the issuing part starts issuing of the second position command substantially simultaneously with start of deceleration of the first position command speed, and
the position controller generates, after start of issuing of the second position command, the speed command based on the position deviation between the first position command and the second position command which are added and the motor position.

11. The motor control device according to claim 2, wherein:
the speed matching instruction part includes:
a calculator configured to calculate a theoretical position deviation based on the motor speed and a position loop gain of the position controller when the motor speed matches the first position command speed after the cancellation of the torque limiting; and
a subtractor configured to subtract, from the position deviation, the accumulated position deviation calculated by the holding part which is a difference value between the position deviation and the theoretical position deviation calculated by the calculator.

12. The motor control device according to claim 11, wherein:
the issuing part starts issuing of the second position command after completion of issuing of the first position command, and
the position controller generates, after start of issuing of the second position command, the speed command based on a position deviation between the second position command and the motor position.

13. The motor control device according to claim 12, wherein:
the issuing part issues the second position command so as to have the speed profile where a second position command speed which is a time differential value of the second position command is accelerated at a predetermined acceleration, becomes constant at a predetermined speed and is decelerated at a predetermined deceleration.

14. The motor control device according to claim 11, wherein:
the issuing part starts issuing of the second position command in middle of deceleration of the first position command speed, and
the position controller generates, after start of issuing of the second position command, the speed command based on the position deviation between the first position command and the second position command which are added and the motor position.

15. The motor control device according to claim 14, wherein:
the issuing part issues the second position command so as to have the speed profile where the first position command speed in middle of deceleration reaches a predetermined speed, thereafter becomes constant at the predetermined speed and is decelerated at a predetermined deceleration.

16. The motor control device according to claim 14, wherein:
the issuing part issues the second position command so as to have the speed profile where the first position command speed in middle of deceleration reaches a predetermined speed, and is thereafter decelerated at a predetermined deceleration.

17. The motor control device according to claim 16, wherein:
the controller further includes a deceleration correcting part configured to correct, when issuing of the first position command is completed, the deceleration of the speed profile based on the accumulated position deviation at the completion of the issuing.

18. The motor control device according to claim 11, wherein:
the issuing part starts issuing of the second position command substantially simultaneously with start of deceleration of the first position command speed, and
the position controller generates, after start of issuing of the second position command, the speed command based on the position deviation between the first position command and the second position command which are added and the motor position.

19. The motor control device according to claim 18, wherein:

the issuing part issues the second position command so as to have the speed profile where an addition speed of the first position command speed and the second position command speed is decelerated at a predetermined deceleration.

20. A motor control device comprising:

a main circuit that includes a converter configured to convert an alternating-current from an alternating-current power source into a direct-current power, a smoothing capacitor, and an inverter configured to convert the direct-current power into an alternating-current power to drive a motor;

a voltage detector configured to detect a direct-current voltage of the main circuit; and a controller that includes a position controller configured to generate a speed command based on a position deviation between a first position command from a master controller and a motor position, and a speed controller configured to generate a torque command based on a speed deviation between the speed command and a motor speed and is configured to control the inverter based on the torque command, the controller including:

means for starting torque limiting which limits a command torque by the torque command to a predetermined torque or less when the voltage detector detects that the direct-current voltage falls below a predetermined voltage and for canceling the torque limiting when the voltage detector detects that the direct-current voltage exceeds the predetermined voltage;

means for matching the speed command with a first position command speed, which is a time differential value of the first position command, when the motor speed matches the first position command speed after the cancellation of the torque limiting;

means for calculating and holding an accumulated position deviation which is the position deviation accumulated at least during the torque limiting; and means for issuing, with a predetermined speed profile, a second position command corresponding to the accumulated position deviation held by the holding part after start of deceleration of the first position command speed.

* * * * *